(12) United States Patent
Hamid

(10) Patent No.: US 9,129,114 B2
(45) Date of Patent: Sep. 8, 2015

(54) PREBOOT ENVIRONMENT WITH SYSTEM SECURITY CHECK

(71) Applicant: Imation Corp., Oakdale, MN (US)

(72) Inventor: Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 256 days.

(21) Appl. No.: 13/692,421

(22) Filed: Dec. 3, 2012

(65) Prior Publication Data

US 2014/0156981 A1 Jun. 5, 2014

(51) Int. Cl.
| | |
|---|---|
| G06F 9/24 | (2006.01) |
| G06F 15/177 | (2006.01) |
| G06F 21/57 | (2013.01) |
| G06F 21/56 | (2013.01) |
| G06F 11/10 | (2006.01) |
| H04L 29/06 | (2006.01) |
| G06F 12/02 | (2006.01) |
| G06F 17/30 | (2006.01) |

(52) U.S. Cl.
CPC ............ *G06F 21/575* (2013.01); *G06F 21/568* (2013.01); *G06F 11/1008* (2013.01); *G06F 12/0246* (2013.01); *G06F 17/30371* (2013.01); *H04L 63/123* (2013.01)

(58) Field of Classification Search
CPC ............ G06F 11/1008; G06F 12/0246; G06F 17/30371; H04L 63/123
USPC .............. 713/1, 2, 100; 714/763, 799; 726/22
See application file for complete search history.

(56) References Cited

U.S. PATENT DOCUMENTS

| | | | |
|---|---|---|---|
| 6,061,788 A | 5/2000 | Reynaud et al. | |
| 6,314,532 B1 | 11/2001 | Daudelin et al. | |
| 6,381,694 B1 | 4/2002 | Yen | |
| 6,542,979 B1 | 4/2003 | Eckardt | |
| 6,625,754 B1 | 9/2003 | Aguilar et al. | |

(Continued)

FOREIGN PATENT DOCUMENTS

WO WO2011025185 A2 3/2011

OTHER PUBLICATIONS

Yee, Bennet. "Using Secure Coprocessors." School of Computer Science, Carnegie Mellon University, Pittsburgh, PA. May 1994. Thesis. 20 pages.

(Continued)

*Primary Examiner* — Michael J Brown
(74) *Attorney, Agent, or Firm* — Dorsey & Whitney LLP

(57) ABSTRACT

Booting an operating system that includes a secure preboot environment that performs integrity checks against security threats. A computer system boots to a preboot environment, which performs integrity checks and other anti-malware operations. Once the preboot environment finishes, the system reboots into a regular environment. The preboot environment can reside on a secure portion of a flash memory, with a computer system booting therefrom; or the preboot environment can reside securely in the computer system. The preboot environment includes integrity checks for a regular environment, and anti-malware programming. Once the preboot environment is done, the computer system reboots into a regular environment, such as from the flash memory or on the computer system. The integrity checks confirm that files in the regular environment are unchanged or uninfected. The integrity checks include determining the accuracy of a trusted system configuration on the computer system, such as using a TPM.

20 Claims, 2 Drawing Sheets

(56) References Cited

U.S. PATENT DOCUMENTS

| | | |
|---|---|---|
| 7,174,457 B1 | 2/2007 | England et al. |
| 8,060,735 B2 | 11/2011 | Madjlessi |
| 2008/0052507 A1 | 2/2008 | Chow et al. |
| 2009/0070576 A1* | 3/2009 | Hocking et al. ............ 713/2 |
| 2010/0235596 A1 | 9/2010 | Carpenter et al. |
| 2011/0055537 A1 | 3/2011 | Yang |
| 2012/0042156 A1 | 2/2012 | Ma et al. |
| 2012/0151219 A1 | 6/2012 | Ryu et al. |
| 2012/0284494 A1 | 11/2012 | Funk et al. |

OTHER PUBLICATIONS

U.S. Appl. No. 13/692,358, filed Dec. 3, 2012, not yet published.
U.S. Appl. No. 13/692,553, field Dec. 3, 2012, not yet published.

* cited by examiner

PREBOOT ENVIRONMENT WITH SYSTEM SECURITY CHECK

CROSS-REFERENCE TO RELATED APPLICATIONS

Inventions described in this application can also be used in combination or conjunction, or otherwise, with techniques described in one or more of the following documents.

U.S. patent application Ser. No. 13/692,358, filed Dec. 3, 2012, in the name of the same inventor, titled "Recovering from Unexpected Flash Drive Removal," and U.S. patent application Ser. No. 13/692,553, filed Dec. 3, 2012, in the name of the same inventor, titled "Bootability with Multiple Logical Unit Numbers."

Each and every one of these documents is hereby incorporated by reference as if fully set forth herein. These documents are sometimes referred to herein as the "Incorporated Disclosures".

BACKGROUND

1. Field of the Disclosure

This application generally relates to a preboot environment with a system security check, and related matters.

2. Background of the Disclosure

"Flash memory" is a commonly used term for non-volatile data storage that can be read and written multiple times. Flash memory is often used in devices including memory that can communicate with a computer system using a universal serial bus (USB) protocol, sometimes called "flash drives", "flash memory devices", or "USB flash drives". Flash drives can often maintain relatively large amounts of data, often sufficiently large that operating system software and a suite of application program software can be maintained in the flash memory. Other devices, such as a rewritable compact disc (CD-RW or CD), or such as a rewritable digital video disc (DVD-RW, DVD+RW, or DVD-RAM), can also sometimes maintain relatively large amounts of data.

One consequence of being able to store such relatively large amounts of data is that flash drives might be used to maintain an entire operating environment, including both operating system software and application software, as well as documents or other data in use or saved by a user. An operating environment that can be carried about, often on a key ring or in a pocket, is sometimes called a "portable operating environment". For example, one such environment is the "Windows to Go"™ environment promoted by Microsoft Corporation of Redmond, Wash. Advantages of portable operating environments include (A) that a user can maintain an entire set of settings for personalized use on any available computer system, and (B) that a user can conduct their computer processing on any available computer system, without leaving personal or otherwise sensitive data for later review by unauthorized persons.

Personal computer systems are often subject to attacks from "malware", that is, software that is designed to damage the computer system, compromise its security, or otherwise use its resources as they were not intended by the user. For some examples, malware includes computer viruses, "rootkits", and other threats. Malware has become increasingly adept at hiding and at preventing its removal by tools designed to remove it, including loading itself into critical and privileged system components and hiding from the usual methods that anti-virus products use to detect viruses and other malware. Moreover, at least some malware has become adept at installing itself through new and different techniques, including network connections, removable storage devices, and otherwise.

For example, some rootkits have been known to infect BIOS firmware, which might not be detectable by ordinary anti-virus techniques. Malware has been known to attack infected systems, such as by downloading malicious payloads (including other and further malware), stealing private information (including user identification and passwords), hijacking computer systems (such as for use in generating spam), and allowing malicious persons to remotely terminate operation of the computer system.

While portable operating environments have several advantages, it sometimes occurs that they might be subject to malware that has infected a computer system on which the user desires to run the portable operating environment. In such cases, the portable operating environment might be at risk for itself being infected by the computer system on which the user desires to run the portable operating environment, particularly when the user of the portable operating environment cannot be assured of the security of that computer system. For example, while executing the portable operating environment, the computer system might also be executing malware that can infect the portable operating environment.

One possibility is to include, in the portable operating environment, at least some software that scans for, and possibly removes, malware. The portable operating environment might attempt to clean itself of malware, or possibly might attempt to clean the host computer system of malware as well. While this might achieve the general purpose of searching for and possibly removing malware, it has the drawback that it can be very difficult to detect and remove malware in a then-executing system.

A further possibility is to boot the computer system into a "safe mode", in which software that scans for malware, and possibly removes it, can freely operate. While this might achieve the general purpose of searching for and possibly removing malware, it might be subject to several drawbacks. (A) Even a "safe mode" might not be free of malware infections. (B) The user might not be familiar with booting the computer system into a distinct environment. (C) While conducting these operations, the user would have unfettered access to privileged portions of the computer system, with the possibility that the user might accidentally or intentionally damage the computer system, and with the possibility that the user would be able to read and copy sensitive information on the computer system (such as files belonging to other users).

Each of these examples, as well as other possible considerations, can cause difficulty in a portable operating environment, particularly when reliability and security of that portable operating environment are important to the user. For example, there is the possibility that the portable operating environment might become infected with malware, or the host computing system might become infected with malware. Each of these possibilities might have a detrimental effect on the value of the computer system and on use of a portable operating environment therewith.

BRIEF SUMMARY OF THE DISCLOSURE

This application provides techniques for booting an operating system which includes a secure preboot environment that performs integrity checks against possible malware or other threats, and which prevents unauthorized access to privileged software and other data on the computer system. In one embodiment, a computer system first boots to a secure preboot environment, which performs integrity checks and possibly performs other anti-malware operations. Once the preboot environment has performed the integrity checks, the computer system reboots into a regular operating environment.

In one embodiment, the integrity checks can include confirming that one or more system files in the regular operating environment are unchanged or uninfected. The integrity checks can also include detecting malware and can, in some embodiments, include removing that malware, or those operations can be separately performed by an anti-malware program which is executed by the preboot environment. In one embodiment, the integrity checks can include determining the accuracy of a trusted system configuration on the computer system, such as if the computer system includes a Trusted Platform Module (TPM) or other security subsystem.

For example, other anti-malware operations can include: (A) checking system software for being up-to-date, for including all security updates, and for not including any viruses or other malware, (B) checking one or more networks, to which the computer system has access, for malicious or other untrustworthy activity, (C) checking security certificates on the computer system for being out-of-date or otherwise untrustworthiness, and (D) checking the master boot record (MBR) against a known good MBR.

In one embodiment, the secure preboot environment can be invoked at times other than just when the computer system is initially started. For example, the secure preboot environment can be invoked in response to (A) erroneous, suspicious, or other untrustworthy activity, (B) in response to user request, (C) in response to system shutdown, or (D) in response to a system crash. In such cases, the system would shutdown and reboot into the secure preboot environment.

In one embodiment, the secure preboot environment can determine which integrity checks or other anti-malware operations to conduct, with the effect that not all such checks or other operations are necessarily conducted at every opportunity. For example, the secure preboot environment can determine which checks or other operations to perform in response to (A) a schedule, such as daily, weekly, or monthly, (B) a set of rules or heuristics, such as whether there have been too many suspicious activities or system crashes within a selected time duration, (C) a set of user-selected parameters, such as whether the user desires to have a "more strict" or "less strict" security policy, or (D) a trusted server, such as a source of anti-virus signatures.

For another example, the secure preboot environment can transition into an environment other than the regular operating environment. For example, at a time for system shutdown, the secure preboot environment can ask the user if the system should be rebooted, or if integrity checks and other anti-malware operations should be followed by a complete system shutdown (or restart), rather than rebooting into the regular operating environment.

In one embodiment, the system uses a flash memory device, which is coupled to a computer system. The computer system boots from the flash memory device, first from a preboot environment located at least in part in a secure section on the flash memory device, such as a read-only portion of the flash memory device. The preboot environment includes a program that performs integrity checks for a regular operating environment, as well as possibly an anti-malware program. Once the integrity checks have been performed and the anti-malware program has performed its operations, the computer system can reboot from the flash memory device into a regular operating environment, such as either (A) a portable operating environment, or (B) a regular operating environment on the computer system.

In alternative embodiments, the computer system boots directly from a read-only preboot environment, which performs similar functions as the preboot environment described with respect to the flash memory device. The read-only preboot environment similarly performs integrity checks, similarly possibly detects anti-malware checks and, in some embodiments, similarly removes that malware. The read-only preboot environment similarly can communicate with a TPM or other security subsystem, such as by using the computer system. The read-only preboot environment can similarly reboot to a regular operating environment, such as a portable operating environment, or a regular operating environment on the computer system.

For example, the system can use a storage device that conforms to the Opal Storage Specification, to store relatively large amounts of data in a trusted manner. Opal drives generally include self-encrypting disk drives that are installed in the computer system and are not generally portable. As described herein, an Opal drive can include a environment, such as a portion that has been configured as read-only. For example, a preboot environment as described herein can maintain information on an Opal drive, can maintain information partially on a first Opal drive and on a second Opal drive, or can maintain information partially on an Opal drive and partially on a flash memory device. In this context, "maintaining information partially" on an Opal drive and partially otherwise can include the possibility that the information should be combined with a function, such as a cryptographic function, of data in separate locations.

After reading this application, those skilled in the art would recognize that techniques shown in this application are applicable to fields and information other than those fields specifically described herein, and to other than flash memories. In the context of the invention, there is no particular requirement for any such limitation. For example, the invention is also applicable to other forms of data storage in which the computer system can boot from that data storage.

Moreover, after reading this application, those skilled in the art would recognize that techniques shown in this application are applicable to methods and systems other than those involving booting from read-only sections of portable devices. In the context of the invention, there is no particular requirement for any such limitation. For example, other contexts can include other forms of secured data, such as data that is otherwise hardware-protected or software-protected.

After reading this application, which shows and describes illustrative embodiments of the disclosure, other and further embodiments of the present disclosure will become apparent to those skilled in the art. As will be realized, the various embodiments of the present disclosure are capable of modifications in various obvious aspects, all without departing from the scope and spirit of the present disclosure. The drawings and detailed description are illustrative in nature and not restrictive in any way.

DETAILED DESCRIPTION

Example System Elements

Figure 1:
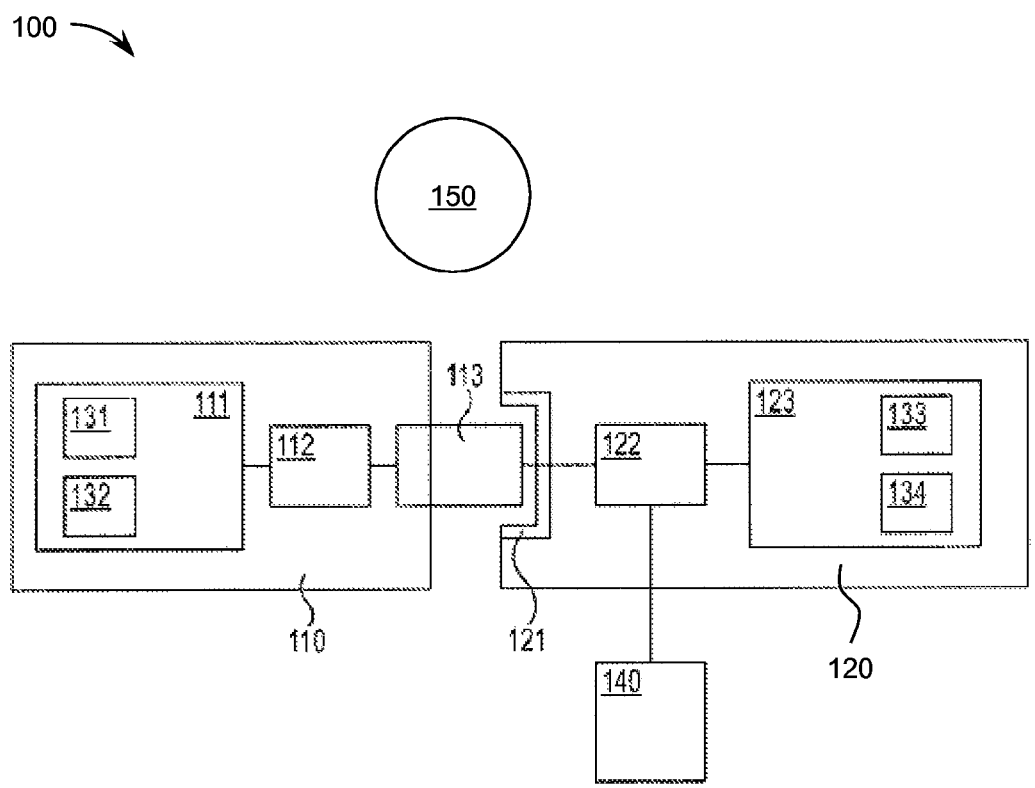
FIG. 1 shows a conceptual drawing of an apparatus including a flash memory device.

FIG. 1 shows a conceptual drawing of an apparatus including a flash memory device.

In one embodiment, a system 100 can include a flash memory device 110 and a computer system 120, and optionally a TPM 140. In one embodiment, a user 150, such one or more persons, can operate the system 100.

FLASH MEMORY DEVICE. The flash memory device 110 can include one or more memories 111, one or more processing elements 112, and at least one flash device plug 113. For example, the flash memory device 110 can be disposed to be compatible with a universal serial bus (USB) standard, or a variant thereof, and can be packaged in a relatively small package disposed to be coupled to a USB port 121 (described with reference to the computer system 120), or a variant thereof.

While this application primarily describes a system in which the flash memory device 110 is coupled to the computer system 120 using a USB standard or a variant thereof, in the context of the invention, there is no particular requirement for any such limitation. For a first example, the flash memory device 110 can be coupled to the computer system 120 using another way to couple devices to computer systems, such as a Thunderbolt™ drive available from Apple, Inc. of Cupertino, Calif. For a second example, the flash memory device 110 can be coupled to the computer system 120 using a network connection, a wireless connection, or another type of connection available for communication between computing devices.

In one embodiment, the one or more memories in can include a read-only zone 131, for which the flash memory device 110 allows only read operations and prohibits write operations that might be requested by the processor 112 or the computing system 120. This has the effect that the processor 112, the computing system 120, or other users of the flash memory device 110, cannot readily alter the content of the read-only zone 131.

In one embodiment, the read-only zone 131 can include a preboot environment, including a set of instructions interpretable by a computing device, and data usable by a computing device (such as in combination or conjunction with that set of instructions), and directing that computing device to perform operations as described herein. For example, the read-only zone 131 can include any non-modifiable memory or storage element, such an Opal storage device, ROM, or other device that is read-only. In one embodiment, the preboot environment can be maintained on more than one such read-only device, such as (A) a flash memory device plus an Opal storage device, (B) more than one flash memory device, (C) more than one Opal storage device, (D) some combination or conjunction thereof, or otherwise.

The preboot environment can direct the computing device to perform (A) integrity checking operations, such as confirming that a regular operating environment is accurate and is free from malware, (B) anti-malware operations, such as scanning a regular operating environment for malware, and (C) other security operations, such as determining that a computing system coupled to the flash memory device 110 is trusted or is authorized to operate with the flash memory device 110.

In one embodiment, the computing device that operates with the read-only zone 131 can include the processor 112, the computing system 120, some combination or conjunction thereof, or otherwise. For example, the processor 112 can make multiple security determinations. These can include at least the following. (A) The computing system 120 is authorized to operate with the set of instructions and the data in the read-only zone 131. (B) The computing system 120 can boot from the read-only zone 131 into a preboot environment. (C) The computing system 120 can communicate with a Trusted Platform Module, to assure a degree of security for the preboot environment and for the computing system 120.

In one embodiment, the one or more memories 111 can include a secure read/write zone 132, for which the flash memory device 110 allows both read operations and write operations that might be requested by the processor 112 or the computing system 120. This has the effect that the processor 112, the computing system 120, or other users of the flash memory device 110, can only read from the secure read/write zone 132 with sufficient access authorization. However, the flash memory device 110 does not allow viewing data at the request of programs in the regular operating environment. For example, the secure read/write zone 132 could be maintained hidden from a directory structure of files maintained by the flash memory device 110, without special access by the computer system 120 (such as "administrator" privileges). This has the effect that the secure read/write zone 132 can maintain information for use by the preboot environment, without that information being readily available to application programs in the regular operating environment.

In one embodiment, the secure read/write zone 132 can include read/write data locations for use by the preboot environment.

For a first example, the preboot environment can compute a secure hash value, as described below, with respect to one or more files in the regular operating environment, and can store one or more results of those computations in the secure read/write zone 132. In alternative embodiments, the preboot environment can compute the secure hash value and store one or more results of those computations in an ordinary read/write portion of the one or more memories 111, as the preboot environment has control of the processor 112 or the computing system 120 during those computations.

For a second example, the preboot environment can maintain a set of virus signatures, or other anti-malware database, in the secure read/write zone 132. This has the effect that the preboot environment can update those virus signatures, or other anti-malware database, in response to changes from a trusted source, without any requirement for a hardware change to the flash memory device 110.

Although this application primarily describes embodiments in which the TPM 140 is coupled to the computer system 120 and not to the flash memory device 110, in the context of the invention, there is no particular requirement for any such limitation. For example, the flash memory device 110 or other removable storage could be coupled to the Trusted Platform Module 140, either directly or using the computing system 120, and can communicate with the Trusted Platform Module 140. This would have the effect that the flash memory device 110 (or other removable storage) could use the TPM 140 to authenticate the preboot environment, determine the authenticity and authorization of the computer system 120, perform other security checks, or otherwise.

COMPUTER SYSTEM. The computer system 120 can include a USB port 121, a processor 122, and memory or storage 123. For example, the USB port 121 can be coupled to the processor 122, which can be coupled to the memory or storage 123.

In one embodiment, the memory or storage 123 can include a read-only zone 133, for which the computer system 120 allows only read operations and prohibits write operations that might be requested by the processor 122. This has the effect that the processor 122, or other users of the computer system 120, cannot readily alter the content of the read-only zone 133. For a first example, the read-only zone 133 can be protected against writing by hardware elements, such as if the read-only zone 133 includes ROM or other hardware for which there is no writing circuit. For a second example, the read-only zone 133 can be protected against writing by software elements, such as if a relatively low-level or otherwise secure portion of the computer system 120 prevents writing to the read-only zone 133, or such as if the device itself implements a security technique that prevents unwanted write operations (such as an Opal storage element with a band configured to be read-only).

In one embodiment, the read-only zone 133 can be similar to the read-only zone 131 of the flash memory device 110. The read-only zone 133 can include a preboot environment for the computer system 120, including a set of instructions interpretable by a computing device, and data usable by a computing device (such as in combination or conjunction with that set of instructions), and directing that computing device to perform operations as described herein. Similar to the flash memory device 110, the preboot environment can direct the computing device to perform integrity checking operations (such as confirming that a regular operating environment is accurate and is free from malware), anti-malware operations (such as scanning a regular operating environment for malware), and other security operations (such as authenticating a TPM, as described herein).

In one embodiment, the computing system 120 can boot directly to the preboot environment in the read-only zone 133.

In one embodiment, the computing system 120 can communicate with a TPM 140 to assure that the preboot environment is authorized and secure. The preboot environment communicates with the TPM 140, which can exchange security information (not shown) with the computing system 120 to determine whether the preboot environment is authorized and secure. If the preboot environment is authorized and secure, the TPM 140 allows the preboot environment to proceed.

Similar to the flash memory device 110, in one embodiment, the memory or storage 123 can include a secure read/write zone 134, for which the computing system 120 allows both read operations and write operations that might be requested by a computing device. Similar to described above, the computing device can include the computing system's processor 122, the flash memory device's processor 112, some combination or conjunction thereof, or otherwise. Similar to described above, this has the effect that the computing system's processor 122, the flash memory device's processor 112, or other users of the read/write zone 134, can only read from the secure read/write zone 134 with sufficient access authorization. Similar to described above, the computing system 120 does not allow data in the read/write zone 134 to be viewed at the request of programs in the regular operating environment.

Similar to described above, in one embodiment, the secure read/write zone 134 can include read/write data locations for use by the preboot environment, such as computed information (similar to described above), such as virus signatures (similar to described above), or otherwise.

TRUSTED PLATFORM MODULE. The TPM 140 can be coupled to the computer system 120 and can include processing capability and security information sufficient to determine the authenticity and authorization of the flash memory device 110, the computer system 120, the preboot environment, the regular operating environment, or otherwise.

In one embodiment, the TPM 140 can be coupled to the computer system 120. The computer system 120 can communicate with the TPM 140 and can exchange security information with the TPM 140. For example, the security information can include cryptographic keys, such as asymmetric keys in a public-key cryptosystem, or symmetric keys in a symmetric cryptosystem. The security information can include, in addition or instead, other information such as shared secrets, trusted certificates, or otherwise.

In one embodiment, the computer system 120 operates under direction of the preboot environment to determine that the computer system 120 is authorized to operate with the flash memory device 110. For example, the flash memory device's processor 112 can execute instructions from the preboot environment to direct the computer system 120 to communicate with the TPM 140, and can determine if the responses from the TPM 140 indicate that the computer system 120 can be trusted.

Although this application primarily describes embodiments in which the TPM 140 operates in combination or conjunction with the preboot environment, in the context of the invention, there is no particular requirement for any such limitation. For example, the regular computing environment can, in addition or instead of the preboot environment, also use the TPM 140 to authenticate and determine a trust value for the computer system 120.

Moreover, although this application primarily describes embodiments in which the TPM 140 operates to determine whether the computer system 120 is trusted, in the context of the invention, there is no particular requirement for any such limitation, nor is there any particular requirement for any embodiment to include a TPM. For example, the TPM 140, when one is used, can operate to determine whether one or more of the following is trusted: (A) the flash memory device 110 or other removable storage, (B) the collective combination of the flash memory device 110 or other removable storage and the computer system 120, or (C) other devices coupled to or accessible by the flash memory device 110 or the computer system 120.

Method of Operation

Figure 2:
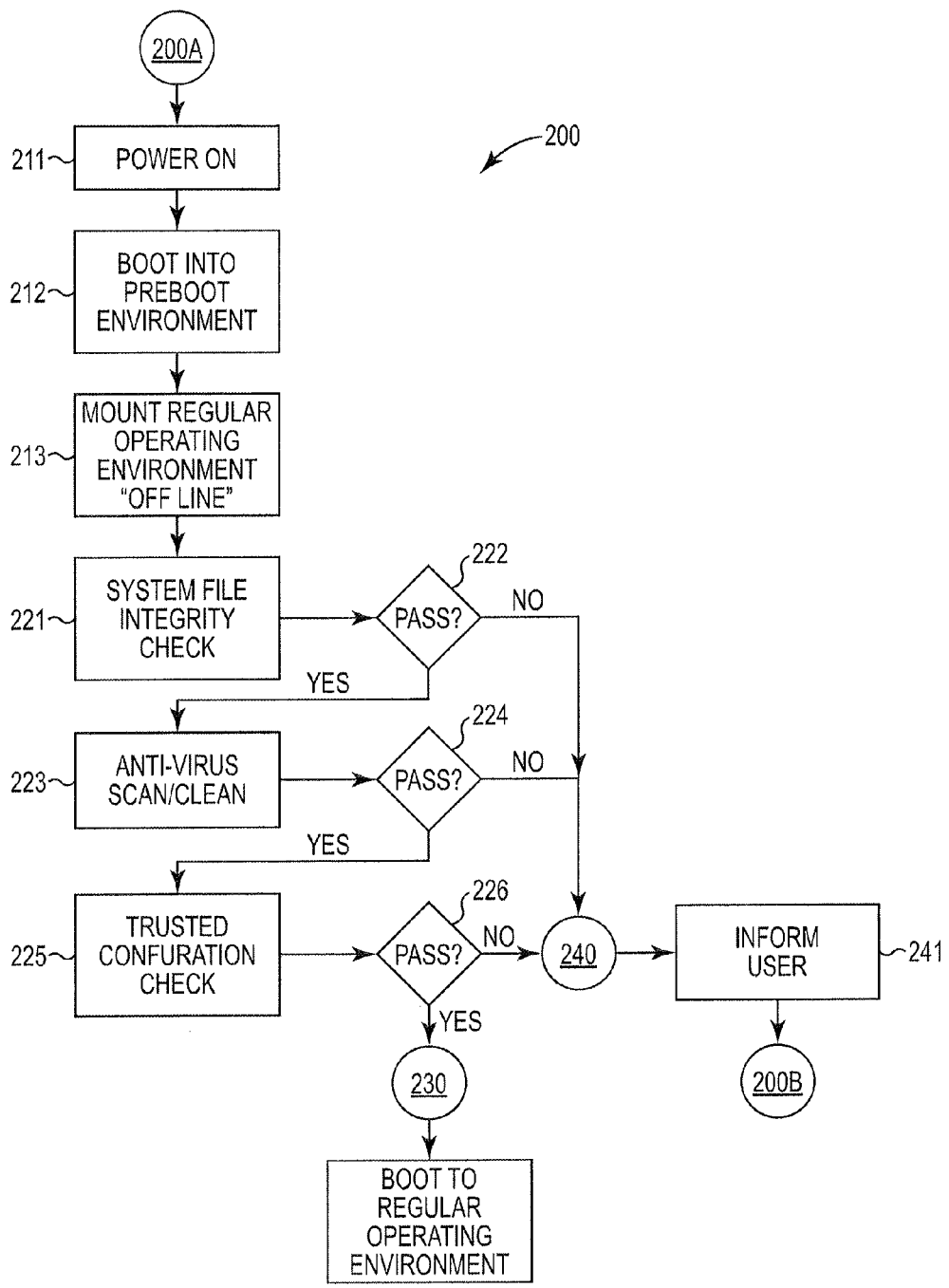
FIG. 2 shows a conceptual drawing of a method of operation.

FIG. 2 shows a conceptual drawing of a method of operation.

A method 200 includes a set of flow labels and method steps, as further described herein. Although this application describes one or more flow labels and method steps in sequence, in the context of the invention, there is no particular requirement for any such limitation. For example, the method 200 could be performed in parallel, in a pipelined manner, by more than one computing device or other electronic hardware, by more than one process or thread in the one or more computing devices or other electronic hardware, by one or more special purpose electronic devices, or otherwise.

PRE-BOOT ENVIRONMENT. A flow label 200A indicates a beginning of the method 200. In a first embodiment, the method 200 operates on a computer system 120. In a second embodiment, a flash memory device 110 is ready to be coupled to the computer system 120.

At a step 211, the system is powered-on. In a first embodiment, the computer system 120 is powered-on by itself. In a second embodiment, the flash memory device 110 is coupled to the computer system 120 (such as having its USB plug 113 inserted into a corresponding USB port 121 of the computer system 120), with the effect that the flash memory device 110 is powered on using power from the computer system 120.

At a step 212, the system boots into a preboot environment. In a first embodiment, the computer system 120 boots into its own preboot environment by itself, accessing a ROM, a read-only portion of RAM, or another trusted memory. In a second embodiment, the computer system 120 boots from a read-only zone 131 of the flash memory device 110 coupled to the computer system 120 (alternatively, from a read-only zone 133 of the computer system 120 itself). In both such embodiments, the computer system 120 boots into a preboot environment, distinct from its regular operating environment.

At a step 213, the preboot environment mounts the regular operating environment as data, with the effect that the regular operating environment is not yet executed by the computer system 120. In one embodiment, the computer system 120 (such as the processor 122 on the computer system 120) executes instructions from the preboot environment.

SYSTEM CHECKS. At a step 221, the preboot environment performs an integrity check for a set of system files. In one embodiment, the preboot environment maintains a list of system files to maintain secure, computes a secure hash for each of those system files, and compares that secure hash for each system file with a secure hash value it maintains for that corresponding system file. In one embodiment, the preboot environment maintains a set of metadata for each such system file, such as a modified date, and compares that metadata for each system file with a secure metadata value it maintains for that corresponding system file.

At a step 222, the preboot environment determines whether the integrity check passed. In one embodiment, the preboot environment can determine whether the integrity check passed in response to whether all system files are determined to be secure. For example, the preboot environment can determine whether all system files have the correct hash value and the correct metadata. If the integrity check passes, the method 200 proceeds with the next step. If the integrity check does not pass, the method 200 proceeds with a flow label 240.

At a step 223, the preboot environment performs an anti-virus scan, and possibly other anti-malware operations. In one embodiment, the preboot environment obtains a list of files to scan from the system files which have passed the integrity check (such as a root directory, with the effect that the preboot environment has a complete list of systems files to scan), and performs an anti-virus scan on those files to scan.

In one embodiment, the preboot environment maintains a set of virus signatures for the anti-virus scan. In one embodiment, the preboot environment updates those virus signatures using a secure communication path with a trusted source of virus signatures. For example, the preboot environment can maintain a digital certificate of the trusted source, and communicate with the trusted source using an encrypted communication protocol, such as secure sockets layer (SSL) or a variant thereof.

In one embodiment, the preboot environment can perform other anti-malware operations. For example, the preboot environment can scan for rootkits, firmware modifications, and other possible malware threats.

At a step 224, the preboot environment determines whether the anti-virus scan passed (and optionally also determines if other anti-malware operations passed). In one embodiment, the preboot environment can determine that the integrity check passed if all scanned files were shown to be absent of viruses or other malware. If the anti-virus scan passes, the method 200 proceeds with the next step. If the anti-virus scan does not pass, the method 200 proceeds with a flow label 240.

At a step 225, if a TPM or other security subsystem is available, the preboot environment can perform a trusted configuration check in conjunction or cooperation with the TPM. In one embodiment, the preboot environment can maintain a cryptographic key (such as either a symmetric key, an asymmetric key used in a public-key cryptosystem, a shared secret, or some other secure authentication system) with which it can determine whether the computer system 120 can be trusted. See, e.g., Wikipedia article "Trusted Platform Module" (accessed the date this application is filed), hereby incorporated by reference as if fully set forth herein, and including all articles referenced therein.

At a step 226, the preboot environment determines whether the TPM passes its associated security tests. If the TPM passes its associated security tests, the method 200 proceeds with the flow label 230. If the TPM did not pass, the method 200 proceeds with the flow label 240.

REGULAR ENVIRONMENT. A flow label 230 indicates that the system is ready to boot into the regular operating environment.

At a step 231, the computer system 120 boots into the regular operating environment. As noted above, the regular operating environment can include a regular operating environment maintained on the computer system 120, such as in the memory or storage 123, or can include a portable operating environment maintained on the flash memory device 110, some combination or conjunction thereof, or otherwise.

POTENTIAL THREAT. A flow label 240 indicates that the system has detected a potential threat. While the method 200 is performed so that reaching this flow label indicates that a threat is likely, in the context of the invention, there is no particular requirement for any such limitation. For example, the method 200 can reach this flow label if the probability of a threat, or the seriousness of a threat, is sufficient to take action as indicated.

At a step 241, the method 200 informs the user 150 of the potential threat. In one embodiment, the method 200 can display information about the potential threat on an output device (not shown) coupled to the computing system 120, or using a readout on the flash memory device 110, or otherwise.

After informing the user 150 of the potential threat, the method 200 proceeds to the flow label 200B (where the method 200 terminates).

TERMINATION. A flow label 200B indicates that the method 200 terminates. In one embodiment, the method 200 is repeated each time the computer system 120 is powered on, or each time the flash memory device 110 is coupled to the computer system 120, or each time the user 150 attempts to boot the regular operating environment, or on the occurrence of any similar event.

Alternative Embodiments

The present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM);

random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. A method, including:
    booting a computer system into a secure preboot environment maintained at least in part on a removable storage device coupled thereto, said secure preboot environment including instructions directing a processor to perform integrity checks against malware, said secure preboot environment preventing unauthorized access to said instructions;
    performing the integrity checks by executing the instructions on said processor, wherein the integrity checks include a system file integrity check for a set of system files on said computer system and an anti-virus scan on a list of files obtained from the system files that have passed the system file integrity check; and
    upon completing said integrity checks, rebooting said computer system into a portable operating environment maintained at least in part on the removable storage device, said portable operating environment including operating system software for controlling said computer system and for allowing execution of application program software maintained on the removable storage device.

2. A method as in claim 1, including:
    communicating with a trusted platform module coupled to the computer system to authenticate the preboot environment, wherein the trusted platform module further exchanges security information with the computer system sufficient to determine authenticity and authorization of the portable operating environment; and
    determining a trust value for said portable operating environment in response to a result of communicating with said trusted platform module.

3. A method as in claim 1, including:
    communicating with a trusted platform module coupled to the removable storage device, wherein the trusted platform module includes security information sufficient to determine authenticity and authorization of the computer system; and
    determining an accuracy of a trusted system configuration on the computer system in response to a result of communicating with said trusted platform module.

4. A method as in claim 1, including:
    coupling a removable flash memory storage device to said computer system;
    wherein booting into said secure preboot environment includes booting into said secure preboot environment at least in part from a secure portion of said removable flash memory storage device.

5. A method as in claim 1, including:
    coupling a removable flash memory storage device to said computer system;
    wherein rebooting said computer system into said portable operating environment includes rebooting said computer system at least in part from a read-write portion of said removable flash memory storage device.

6. A method as in claim 1, wherein said integrity checks further include:
    scanning one or more files in said portable operating environment for malware or viruses, and
    removing said malware or viruses from the one or more files in said portable operating environment.

7. A method as in claim 1, wherein said secure preboot environment is maintained at least in part on a secure read-only memory of the removable storage device.

8. An apparatus including:
    a removable storage device configured for coupling to a host computer system automatically booting into a secure preboot environment upon startup and operating under control thereof, said secure preboot environment maintained at least in part on the removable storage device and including instructions directing a processor to perform integrity checks against malware, said secure preboot environment preventing unauthorized access to said instructions;
    wherein the integrity checks include a system file integrity check for a set of system files on said host computer system and an anti-virus scan on a list of files obtained from the system files that have passed the system file integrity check; and
    said secure preboot environment including instructions directing said processor to reboot said host computer system into a portable operating environment, said portable operating environment including operating system software for controlling said host computer system and for allowing execution of application program software maintained on the removable storage device.

9. An apparatus as in claim 8, said instructions directing said processor to perform integrity checks including:
    instructions directing said processor to communicate with a trusted platform module coupled to said host computer system to authenticate the preboot environment, wherein the trusted platform module further exchanges security information with said host computer system sufficient to determine authenticity and authorization of the portable operating environment; and
    instructions directing said processor to determine a trust value for said portable operating environment in response to said instructions directing said processor to communicate with said trusted platform module.

10. An apparatus as in claim 8, said instructions directing said processor to perform integrity checks including:
    instructions directing said processor to communicate with a trusted platform module coupled to the removable storage device, wherein the trusted platform module includes security information sufficient to determine authenticity and authorization of the computer system; and
    instructions directing said processor to determine an accuracy of a trusted system configuration on said host computer system in response to said instructions directing said processor to communicate with said trusted platform module.

11. An apparatus as in claim 8, including:
    a flash memory within the removable storage device coupled to said host computer system;

wherein said secure preboot environment is maintained at least in part in a secure portion of said flash memory.

12. An apparatus as in claim 8, including:
a flash memory within the removable storage device coupled to said host computer system;
wherein said portable operating environment is maintained at least in part in a read-write portion of said flash memory.

13. An apparatus as in claim 8, wherein said instructions directing said processor to perform integrity checks include:
instructions directing said processor to scan one or more files in said portable operating environment for malware or viruses, and
instructions directing said processor to remove said malware or viruses from the one or more files in said portable operating environment.

14. An apparatus as in claim 8, wherein the system files that pass the system file integrity check include a root directory such that the preboot environment has a complete list of systems files to scan, and further comprising comparing a secure hash and metadata for each of the system files to values maintained therefore, all of the system files having a correct hash value and correct metadata.

15. An apparatus as in claim 8, wherein the preboot environment mounts the portable operating environment off line and the host computer system executes the instructions from the preboot environment, the portable operating environment not yet being executed.

16. A removable storage device configured for coupling to a host computer, the removable storage device comprising:
memory maintaining a preboot environment automatically executable by the host computer upon startup, the preboot environment including instructions executable on a processor to perform integrity checks comprising:
a system file integrity check for a set of system files on the host computer;
an anti-virus scan on a list of files obtained from the system files that pass the system file integrity check; and
a trusted configuration check on the host computer in conjunction with a trusted platform module, wherein security information is exchanged sufficient to determine authenticity and authorization of the host computer and responses from the trusted platform module indicate that the host computer system can be trusted; and
a processor configured to reboot the host computer to execute a portable operating environment maintained at least in part on the portable storage device, the portable operating environment including operating system software executable to control the host computer and allow for execution of application program software maintained on the removable storage device.

17. A removable storage device as in claim 16, wherein the system files that pass the system file integrity check include a root directory, such that the preboot environment has a complete list of system files to scan.

18. A removable storage device as in claim 17, wherein performing the system file integrity check comprises comparing a secure hash and metadata for each of the system files to values maintained therefore, such that all of the system files have a correct hash value and correct metadata.

19. A removable storage device as in claim 16, wherein the computer system executes the instructions from the preboot environment.

20. A removable storage device as in claim 16, wherein the preboot environment mounts the portable operating environment off line, such that the portable operating environment is not yet executed when the instructions from the preboot environment are executed.

* * * * *